Figure 1:
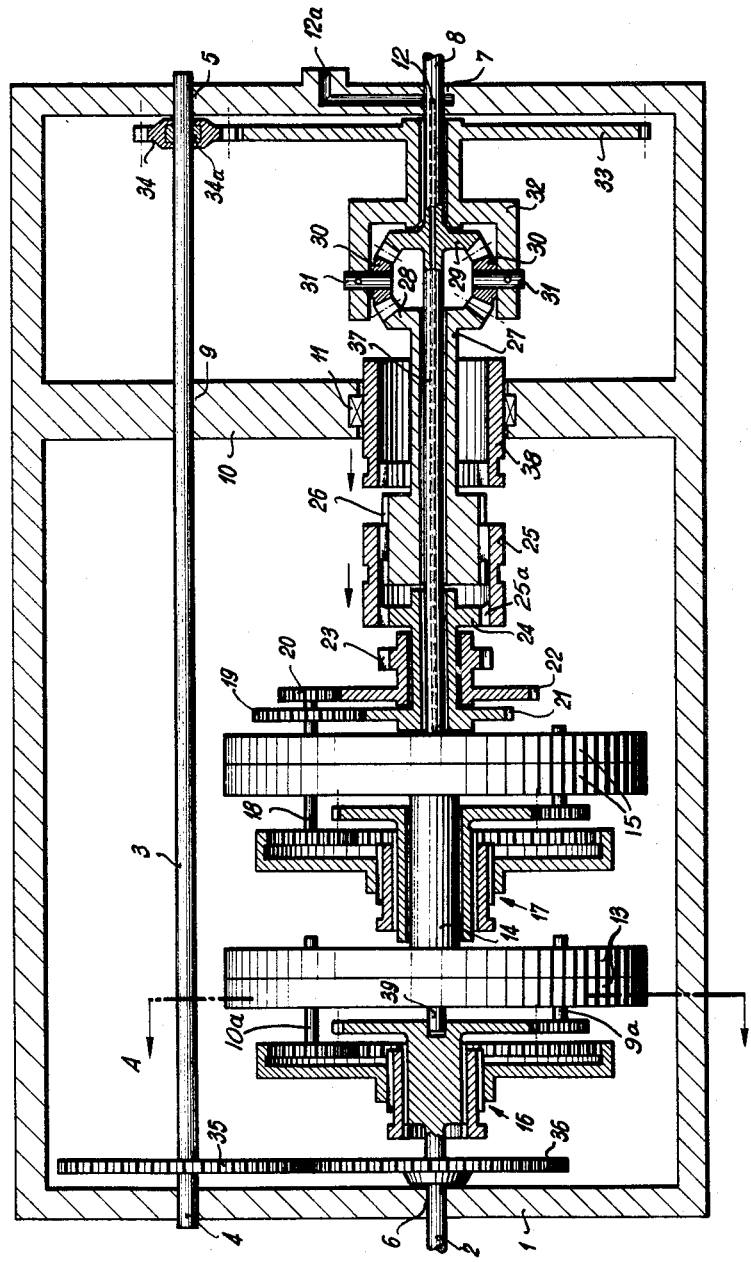

March 22, 1960 E. WOYDT 2,929,269
CONTINUOUSLY VARIABLE DRIVES
Filed Oct. 3, 1956 2 Sheets-Sheet 2
FIG. 2
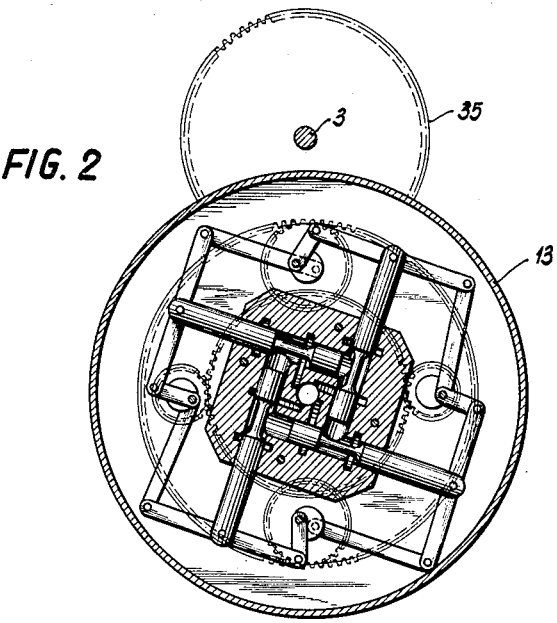
FIG. 3
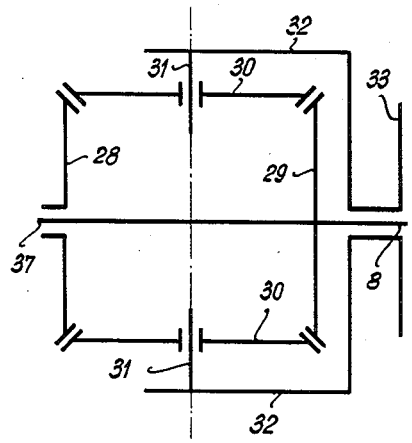
FIG. 4
FIG. 5
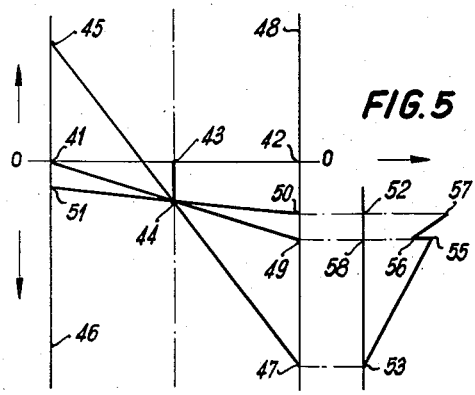
INVENTOR
E. Woydt
By Glascock Downing Seebold
ATTYS.

United States Patent Office 2,929,269
Patented Mar. 22, 1960

2,929,269

CONTINUOUSLY VARIABLE DRIVES

Eduard Woydt, Stuttgart, Germany

Application October 3, 1956, Serial No. 613,661

Claims priority, application Germany
October 24, 1955

8 Claims. (Cl. 74—687)

Infinitely variable drives with power branching into a mechanical and a hydrostatic branch, in which the two branches are united by way of a differential acting on the drive, require for a definite total reduction, for instance 4:1, as is often desirable in the case of motor vehicles, a very great stroke volume for their engine part, even when the hydraulic motor is driven by way of a reduction gear. The invention has for its main object, to reduce the overall height of the drive, so as to make it more suitable for use in vehicles.

Another attempt to reduce the engine stroke volume by means of an end-stage change speed drive, with repeated traverse of the adjustment range of the hydrostatic gear, also entails great difficulties. For, owing to inaccuracy in the adjustment, leakage loss or the like, it becomes necessary to effect a synchronisation, when operating the change speed mechanism. For this purpose the entire gyrating mass of the hydrostatic drive has to be accelerated or retarded, that is to say, correspondingly large couplings or the like have to be provided. Now, according to the invention, during a speed change only relatively small masses, namely only the inner, moving parts of the hydraulic oil motor, are accelerated or retarded. Moreover, in this operation the main power branch is never interrupted. According to the invention, these advantages are realised through the expedient that the hydrostatic branch separates again into a first mechanical sub-branch and into a second mechanical sub-branch, that the mechanical main branch and the first mechanical sub-branch are connected by way of the differential with the second mechanical sub-branch connected to the drive and that, finally, in the first mechanical sub-branch an optionally to be actuated step-up gearing is provided, so that in the latter a change in the speed of revolution is made possible.

Such a drive can be constructed in a particularly compact manner, if according to a prior proposal, U.S. patent application, Serial No. 589,161 of June 4, 1956, in the pump and engine the cylinder or piston axes form a square and the pistons be actuated by lever arms each adapted to be driven at two points by a crankshaft, the angular position of which relative to one another is infinitely variable, and one or more of the crankshafts of the engine bear by way of a change speed mechanism and an epicyclic mechanism against a stepped-down driving branch.

The invention further relates to the construction of a drive, which may be gathered from the following description and illustration of a constructional example.

In the drawings:

Figure 1 is a longitudinal section through the drive, the hydrostatic part being shown in elevation, Figure 2, a section along line A—B of Figure 1, Figure 3, a diagrammatic representation of the epicyclic mechanism and Figure 4, a revolution diagram of the epicyclic mechanism, the speeds of revolution of the wheels 28 and 29 being plotted on the lines 45—46 and 48—47 and the speed of revolution of the casing of the epicyclic mechanism 31—32 in the middle on the line 43—44.

Figure 5 shows the pattern of the change in the stroke volume of the hydraulic motor during the shift beyond the line 52, 53 to the right.

In the casing 1 is supported at 6 the driving shaft 2 and at 7 the driven shaft 8. With the pin 39 the shafts 2 and 8 are rotatably supported one in the other. The shaft 8 has transverse bores 12, through which oil from a tank can be fed through the bore 12a for compensating oil losses in the gear. A by-pass shaft 3 is journalled at 4, 9 and 5. The wheel 36 fixed on the shaft 2 meshes with the wheel 35 and drives wheel 34 which meshes with the wheel 33 and is mounted by means of a free wheel arrangement or overriding clutch 34a on the shaft 3, so that it can rotate faster than the shaft 3. The wheel 33 is fixed to the casing 32 of an epicyclic mechanism 28, 29, 30. The two-part oil pump 13 is driven and adjusted by means of crank shafts 9a, 10a in a known manner (cf. patent application of Eduard Woydt No. 613,027, filed October 1, 1956), by an axially displaceable sleeve 16 and is connected by the shaft 14 rigidly with the two-part hydraulic oil motor 15. The latter itself can be adjusted by means of crank shafts 9a, 10a in a known manner by the control gear 17 which is freely rotatable on the shaft 14 and bears by way of one or two extended eccentric or cranked shafts 18 and the keyed-on gear 19 against the gear 21 or with the smaller gear 20 against the gear 22. The hub of the gear 21 has a claw flange 24 which in the drawing is connected by the coupling sleeve 25 which is equipped with inwardly projecting teeth 25a, with the claw flange 26 of the hollow shaft 27 which at its other end carries the bevel gear 28. The gear 22 can now rotate loosely. On the sleeve 25 being slid so far to the left that its teeth 25a are located in the space between the teeth of the sleeve 23 of the gear 22 and the teeth of the claw flange 24, the gear 21 will also become freely movable. The connection of the motor with the bevel wheel 28 is now interrupted, so that the former, by adjustment of its stroke volume, can be freely altered as regards the speed of revolution of its crank shafts. In order that in the meantime the bevel wheel 28 which is driven by the gear 33 by way of the casing 32 shall not race, it is fixed to the outside by way of the claw flange 26, through the sleeve 38 being slid to the left. The free wheel arrangement 11 only permits of a rotation opposite to that in the sense of rotation of the main shaft 8. By reference to the figures 3, 4 and 5 the shifting operation shall now be described:

In Figure 1 the drive runs without reduction, that is, shaft 2 runs at the same speed of revolution as the shaft 8, in accordance with 42 to 47 in Figure 4. In that case the line 41—42 is the zero line; the positive speeds of revolution are plotted downwards and the negative ones upwards. The speed of revolution of the casing 32 of the epicyclic mechanism always remains constant, namely in Figure 4 the distance 43—44, and is positive. The bevel wheel 28 rotates with the negative speed of revolution 41–45; correspondingly, the wheel 21 also rotates with a negative speed of revolution, whereas the planet wheel 19 always rotates with a positive speed of revolution. The direction of force is, however, not reversed, on the change in the direction of rotation taking place. The wheel 19 and consequently the eccentric shaft 18 runs as a very high speed, but, as the stroke of the engine is at the same time equal to zero (see point 53 in Figure 5, in which the stroke volume of the engine is plotted in the direction of the arrow v), no fluid will flow from the pump to the engine. The stroke of the pump is set to its maximum. When the speed of revolution of the shaft 8 is to be reduced, the stroke volume of the engine is increased, in accordance with the line 53—55 of Figure 5, and the stroke volume of the pump reduced. The oil forced out by the pump 13 now drives the engine 15 which bears by way of 21, 24, 25, 26, 27, 28 against 30 or 32. When the stroke volume of the engine has reached the amount 58–55, the speed of revolution of the shaft 8 will have dropped to the amount 42–49; the speed of revolution of bevel wheel 28 or of 27, 26, 25, 24, 21 will have become equal to zero in the point 41 of Figure 4. Thereupon, the stationary sleeve 38 is slid over the also stationary claw flange 26 and then the sleeve 25 so far to the left that both 24 and 23 can rotate freely. The stroke volume of the engine is now reduced from 58–55 to 58–56. At the same time the drive continues to run uninterruptedly, as the epicyclic mechanism can roll round the stationary bevel wheel 28. At the stroke volume 58–56 the speed of revolution of the shaft 18 will have become so much greater, that the smaller planet wheel 20 together with the unaltered speed of revolution of the shaft 8 or of the casing 15 has brought the sun wheel meshing with it to rest. The also stationary sleeve 25 can easily be slid further to the left, whereby gear 22 becomes rigidly coupled with gear 28. The sleeve 38 is now slid towards the right again, so that the claw flange 26 is no longer hindered by the free-wheel arrangement 11, but can revolve freely. The stroke volume of the engine is now further increased up to its maximum 52–57 and the speed of revolution of the shaft 8 drops from 42–49 to the final value 42–50, Figure 4. The speed of revolution of the wheel 28 will, at the same time, have increased from zero to the positive value 41–51. The stroke volume of the pump now has a very small value, so that no power is transmitted any more hydraulically. Should this reduction have to be reached only with the ratio of the wheels 19 to 21, the stroke volume of the engine would have to become many times the engine stroke volume according to the invention, in order to give this slow speed of revolution and the great moment, or the speed of revolution of the shaft 18 in direct gear would become prohibitively great. For reaccelerating the shaft 8, in the first place the stroke volume of the engine is reduced, from 57 to 56 (Figure 5). The sleeve 38 is again slid over the now stationary claw flange 26, and sleeve 25 is brought out of engagement with the sleeve 23 by being slid to the right. The stroke volume of the engine is further increased from 58–56 to 58–55 (the bevel pinion 28 being meanwhile supported by the free-wheel arrangement 11), the gear 19 running in such a manner that the gear 21 is now stationary. The claw flange 24 can now be coupled with the claw flange 26 by sliding the sleeve 25 further to the right. Now the sleeve 38 is again brought out of engagement with 26. Then the stroke volume can be reduced to zero 53 and the shaft 8 will again rotate with the speed of revolution of the shaft 1.

I claim:

1. A continuously variable hydrostatic drive particularly for vehicles, comprising a driving shaft, a driven shaft, a piston pump rigidly connected to the driven shaft, a hydraulic piston motor rigidly connected to the driven shaft, means for connecting said piston pump and said hydraulic piston motor, crankshafts driven by the driving shaft and driving the pistons of the pump with variable stroke volume, a by-pass shaft spaced from and arranged in parallelism to the driving and driven shafts, drive connections between said by-pass shaft and said driving and driven shafts, crankshafts driven by the driving shaft through the by-pass shaft and driving the pistons of the hydraulic piston motor with variable stroke volume, a differential including bevel wheels, bevel pinions, and a casing operably associated with the driven shaft, a mechanical main power transmission branch including said drive connections with the drive connection between the by-pass shaft and the driven shaft including intermeshing gear means operably associated with the casing of the differential, a hydraulic main power transmission branch defined by said piston pump, hydraulic motor and a sleeve axially displaceable relative to the driving shaft, a first mechanical power transmission sub-branch including gear means rotatable on the driven shaft, a clutching component carried by said gear means, an axially movable clutch means adapted to cooperate with the clutch component on the gear means, a hollow shaft surrounding the driven shaft having a clutching component adapted to cooperate with said clutch means, and one of the bevel wheels of said differential being carried by said hollow shaft, speed raising transmission means located between said hydraulic piston motor and said first mechanical power transmission sub-branch including gears of different diameters on said hydraulic piston motor, one of said gears meshing with the gear means of the first mechanical power transmission sub-branch, a sleeve rotatably mounted on said driven shaft having a gear with which the other of said gears meshes, and a clutch component on said sleeve cooperable with said clutch means, a second mechanical power transmission sub-branch in series with the hydraulic main power transmission branch and including an axially movable coupling having a clutch component adapted to cooperate with the clutch component on the hollow shaft, with the mechanical main branch serving to transmit power from the driving shaft through the by-pass shaft to the differential, the first mechanical power transmission sub-branch serving to transmit power from the hydraulic main branch to the differential, and the second mechanical sub-branch serving to transmit power from the hydraulic main branch directly to the driven shaft.

2. A continuously variable hydrostatic gear as claimed in claim 1, wherein said axially movable coupling is a sleeve for unidirectionally locking against rotation the bevel wheel carried by the hollow shaft (28) of the differential.

3. A continuously variable hydrostatic gear as claimed in claim 1, further comprising means for reducing to zero the speed of revolution of one bevel wheel of the differential, while changing the gear ratio of the speed-raising transmission means by changing the stroke volume of the hydraulic piston motor.

4. A continuously variable hydrostatic gear as claimed in claim 1, further comprising a free-wheel clutch associated with the intermeshing gear means in the mechanical main power-transmission branch.

5. A continuously variable drive, particularly for vehicles, comprising: a driving shaft, a driven shaft coaxial with the driving shaft, a continuously variable hydraulic drive unit rigidly connected with the driven shaft, the said drive unit including a piston pump and a piston motor, planet wheels rotatably mounted on the body of the hydraulic drive unit for controlling the pump, planet wheels rotatably mounted on the body of the hydraulic drive unit for controlling the motor, a by-pass shaft, means transmitting power from the driving shaft to the by-pass shaft, a differential having at least three members, a first member of the differential being coupled to the by-pass shaft, a second member of the differential being rigidly connected with the driven shaft, a mechanical change-speed drive including clutch controlled gear means for coupling the third member of the differential with the shafts of the planet wheels controlling the hydraulic piston motor.

6. A continuously variable drive as claimed in claim 5, comprising means on the third member and a sleeve associated therewith for locking the third member of the differential against rotation.

7. A continuously variable drive as claimed in claim 5, further comprising means for controlling the stroke volume of the hydraulic piston motor to the volume at which the speed of revolution of the third member of the differential becomes zero.

8. A continuously variable drive as claimed in claim 5, further comprising a free-wheel clutch interposed between the by-pass shaft and the first member of the differential enabling the by-pass shaft to drive the first member of the differential but not permitting the differential to drive the by-pass shaft.

References Cited in the file of this patent

UNITED STATES PATENTS

| | | |
|---|---|---|
| 2,583,656 | Lay | Jan. 29, 1952 |
| 2,618,988 | Woydt | Nov. 25, 1952 |